United States Patent

[11] 3,594,049

| [72] | Inventor | Peter H. Turner |
| | | Granada Hills, Calif. |
| [21] | Appl. No | 834,851 |
| [22] | Filed | June 19, 1969 |
| [45] | Patented | July 20, 1971 |
| [73] | Assignee | Sargent Industries, Inc. |
| | | Los Angeles, Calif. |

[54] BEARING LINER
24 Claims, 5 Drawing Figs.

[52] U.S. Cl. .................................................. 308/72,
  29/149.5, 161/158, 287/87, 308/238
[51] Int. Cl. ............................................................ F16c 9/06
[50] Field of Search ........................................ 287/87, 90;
  308/3, 238, 72; 161/151, 158, 189, 56, 92;
  29/149.5

[56] References Cited
UNITED STATES PATENTS

| 3,082,485 | 3/1963 | Thomas | 308/238 X |
| 3,198,691 | 8/1965 | Thomas et al. | 161/189 X |
| 3,231,460 | 1/1966 | Andrews | 308/238 X |
| 3,464,845 | 9/1969 | Osborn et al | 161/189 X |
| 3,464,882 | 9/1969 | Morton | 161/158 X |
| 3,471,207 | 10/1969 | McCloskey | 308/238 X |
| 3,507,023 | 4/1970 | Matt et al. | 308/238 X |
| 3,507,527 | 4/1970 | White | 308/72 X |

*Primary Examiner*—Manuel A. Antonakas
*Attorney*—Smyth, Roston & Pavitt

ABSTRACT: A bearing liner which includes a backing member and a mixture of an adhesive and powdered low-friction material. The backing member has a roughened, irregular or porous surface. The adhesive and low-friction material are disposed in a thin layer only a few mils thick so that the particles of the low-friction material are mechanically supported in a fixed position within the pores of the backing member. This fixed positioning of the particles is facilitated by the chemical bonding provided by the adhesive. The bearing liner is disposed with the backing member supported by a bearing member.

PATENTED JUL20 1971

INVENTOR:
Peter H. Turner

ATTORNEYS

BEARING LINER

The present invention relates to bearing liners usable, for example, between the ball and race of a ball joint. In use, a bearing liner may be adhered to the race and slidably engage the ball. The bearing liner should have a low coefficient of friction and prevent the ball and race surfaces from coming into contact with each other.

There are many prior art bearing liners, one of which includes woven low-friction strands of fibers joined to bondable strands or fibers which are in turn adhered to a bearing member. The low-friction strands and bondable strands are interwoven so that the bearing surface facing the rotatable member is formed primarily from the low-friction material and the surface adhered to the backing member is formed primarily from the bondable strands. The bondable strands form the base or backing for the low-friction strands. The thickness of the woven low-friction strands as measured form the top of the bondable strands may be of the order of 0.006 inch. One problem with this construction and other prior art bearing liners is that the useful life thereof is not as long as desired.

In attempting to improve the useful life of the bearing liner, it has been discovered that the prior art bearing liner described hereinabove wears very rapidly when initially used. Specifically, at least 0.001 inch of this prior art bearing liner becomes removed in the first 10 cycles of operation. Thus, approximately 16 percent of the low-friction material is worn away at the very outset. This very rapid wear continues at a reduced rate until about 0.003 inch or 50 percent of the low-friction material of the bearing liner is worn away after about 10 percent of the useful bearing liner life has expired. The remaining 90 percent of bearing liner life is obtained from the last 50 percent of the low-friction material. By the time that about 50 percent of the liner is worn away, the low-friction strands have become fused, and the bearing liner consists essentially of chunks of low-friction material with a few fibers embedded therein.

A significant disadvantage of the high initial wear and thickness reduction of the bearing liner is that the race fits loosely over the ball with the looseness being the result of the prior wearing away of the bearing liner. The "play" between the ball and race results in point loading of the ball and race with consequent high stresses which promote relatively rapid wear. In addition, the looseness causes impact loading of the bearing which also operates to reduce bearing life.

The high initial wear is caused in part by the outer regions, i.e., those remote from the bonding strands or backing, being sheared off. This is caused by such outer regions being too remote from the backing member to be adequately supported thereby. Accordingly, the present invention limits the thickness of the low-friction layer to an amount which can be adequately supported by the backing member without danger of a high initial shearing action. Thus, with the present invention, rapid initial wear of the bearing liner is minimized.

To maximize life of the bearing liner, there must be at least a minimum amount of low-friction material on a given surface area of the bearing liner. On the other hand, the low-friction layer must not be so thick that rapid initial wear will occur.

The present invention teaches that bearing liner life can be materially increased by utilizing a low-friction layer which includes powdered low-friction material dispersed in a suitable binder and by disposing this layer on a backing member with a thickness significantly less than the thickness of the bearing liners of the prior art. These factors operate individually and collective to significantly increase the useful life of a bearing liner. The thickness reduction of the bearing liner, while dimensional in character, produces highly unexpected results as a reduction in bearing liner thickness would be expected to yield a corresponding reduction in bearing life.

According to the present invention, the low-friction layer is applied to a backing member of backing sheet which is preferably in the form of a woven fabric. The primary functions of the backing member are to impart strength to the bearing liner and to provide a roughened irregular or porous surface to which the thin layer formed from the adhesive and the low-friction material can readily adhere. Although the backing member may be constructed of a nonwoven fabric or spongelike material, the backing member is preferably in the form of a woven cloth in the interest of providing maximum tensile strength. The individual strands of the cloth should be selected from a material which is strong and which can withstand the temperatures that will be encountered in normal bearing liner service. By way of example, dacron, nylon or fiberglass may be utilized with dacron or nylon being preferred. For the purpose of the terminology of the claims, the term "irregular" to define the surface of the backing member is intended to include "roughened" or "porous".

It has been found that the powdered low-friction material not only fills in around the strands of the backing member but also impregnates the strands to the extent that the powdered material gets between the fibers which form the strands. In this way, the particles of the powdered material tend to be supported mechanically by the pores of the backing member. This assures that an adequate amount of low-friction material is provided without thickening of the low-friction material layer beyond permissible limits.

Another advantage of using a binder and powdered low-friction material is that the resultant layer is much stronger than the woven fiber layer of the prior art. With the present invention the adhesive imparts substantial chemical strength to the particles of low-friction material to aid the mechanical strength imparted to the low-friction material by the pores of the backing member.

The low-friction material may consists of any self-lubricating material which can be embodied in powdered form. Examples of such material are polytetrafluoroethylene (commonly designated by the trademark "Teflon") fluoroethylenepropylene, polyethylene, graphite, molybdenum disulfide, nylon, and dacron. Nylon and dacron are generally considered to be abrasive when used with a steel bearing but they may be used, for example, with the ceramic ball which is quite abrasion resistant. For many applications, a fluorocarbon such as polytetrafluoroethylene is preferred. The low-friction layer may also contain a minor proportion of a metal powder additive such as bronze, babbitt or lead.

For optimum results, the particle size of the powder should be small in relation to the cavities and projections formed by the irregular surface of the backing member. This causes the particles to project only a relatively small distance above the peaks of the irregular or porous surface of the backing member so that they are firmly supported by the backing member and so that the particles cannot become spread into a smooth and continuous surface as a result of friction between the ball and the race when the ball is rotated. Furthermore, it is desirable to utilize a finely divided powder so that the particles can bet between the fibers of the strands as described above. Five-micron powder has been found desirable. It is also desirable to provide a fabric as the backing member with pores of a proper size to mechanically lock the powder in the pores.

To maximize wear life, the thickness of the low-friction layer should be between 0.0025 and 0.0035 inch thick with 0.003 inch being considered optimum. The thickness of the low-friction layer is measured from the peaks or the outermost portions of the projections formed on the backing member to the outer face of the low-friction layer. To the extent that the thickness of the low-friction layer exceeds 0.003 inch, bearing liner wear increases and bearing liner life decreases. If the bearing liner thickness is decreased below 0.003 inch, it is difficult to provide sufficient adhesive for bonding of the low-friction layer to the backing member. Alternatively, if an oversupply of adhesive is provided, the amount of powdered low-friction material tends to be reduced with a consequent reduction in bearing liner life. However, thickness of from .0025 inch to 0.0035 inch have been found satisfactory for production purposes.

The binder is preferably an adhesive and serves to bond the low-friction layer to the backing member. The adhesive forms a body in which the powdered low-friction material can be disposed. The adhesive tends to impart significant strength to such body, partly by chemically reinforcing the particles of the low-friction material.

Many different kinds of adhesive may be utilized so long as the adhesive is chemically compatible with the powdered low-friction material and so long as the adhesive cures below the allowable temperature limit of the low-friction material. As will be appreciated, adhesive is provided on one side of the backing member to attach the backing member to the body member or race and adhesive is mixed with the the particles of low-friction material on the other side of the backing member to form the the bearing liner. Preferably the adhesive for mixture with the lower friction material to form the bearing liner and for attaching the bearing liner to the race are identical. In addition, the adhesive should preferably be a 2 -stage adhesive so that the bearing liner will be in a rigid or semirigid state when it is being assembled into the race. Following its assembly into the race, the race and the liner can be heated to cure the adhesive and form a permanent bond between the liner and the race. Phenolic base adhesives have been found desirable for use with a low-friction powder and for bonding of the liner to the race.

The relative proportions of the powdered low-friction material and the adhesive can be varied within limits. Of course, sufficient low-friction material is provided to impart low-friction characteristics to the liner. Generally, the strength of the bond between the low-friction layer and the backing member and the strength of the layer per se increases with an increase in the amount of adhesive utilized. Thus, the maximum amount of powdered low-friction material may be controlled by strength considerations.

The relative proportions of adhesive and low-friction material also affect the rate of wear of the liner. Generally, the wear of the liner can be categorized as initial wear and subsequent wear with initial wear being much more rapid than subsequent wear. Generally, the rate of initial wear increases and the rate of subsequent wear decreases with an increase in the amount of low-friction material. The optimum of low-friction material for maximum wear life can be determined for specific materials and, if this meets the necessary minimum strength requirements, such proportions can be used.

In making the bearing liners, the opposite faces of an elongated strip of backing member are provided with an adhesive layer and a low-friction layer, respectively. The strip is then cut into numerous sections of appropriate sizes with each of the sections being capable of being formed into a bearing liner. To avoid raveling of the woven backing member, the strip is preferably cut along a line which extends at an angle with respect to the strands making up the backing member. Although all four sides of the bearing liner may be cut at an angle relative to the strands, it is only necessary that two of them be cut at an angle with respect to the strands.

The invention, both as to its organization and method of operation, together with further features and advantages thereof, may best be understood by reference to the following description taken in connection with the accompanying drawings in which.

Figure 1:
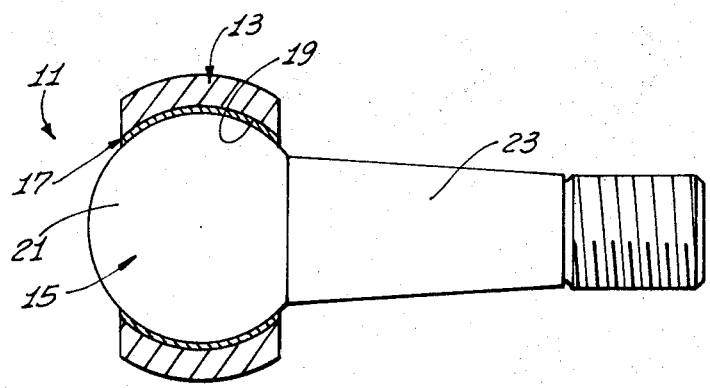
FIG. 1 is an elevational view partially in section of a ball joint having a bearing liner constructed in accordance with the teachings of this invention incorporated therein.

Referring to the drawings and in particular to FIG. 1 thereof, reference numeral 11 designates a bearing constructed in accordance with the teachings of this invention. In the embodiment illustrated, the bearing 11 includes a body member or race 13, a ball 15 and a bearing liner 17 bonded to the inner face of the race and slidably engaging the ball 15. In the embodiment illustrated, the race 13 and the ball 15 constitute relatively movable members which in turn may be attached to other elements, respectively, to permit relative universal movement therebetween. Either or neither of the ball 15 and the race 13 may be fixed. Although the bearing liner 17 is illustrated in combination with a ball joint-type of bearing 11, it should be understood that such use is presented only by way of example and that it may be used in other environments.

More specifically, the race 13 has an inner spherical surface 19 to which the bearing liner 17 is adhesively bonded. The ball 15 has a spherical portion 21 which slidably engages the correspondingly curved inner surface of the bearing liner 17. The ball 15 also has an extension integral with the spherical portion 21 to facilitate attachment of the ball to another element.

The bearing liner 17 (FIG. 2) includes a backing member 25 having first and second faces with an adhesive layer 27 bonded to one face and with a low-friction layer 29 bonded to the other face thereof. The backing member 25 is preferably in the form of a woven sheet and includes a plurality of warp strands 31 (only one being illustrated) and a plurality of filler strands 33. The strands 31 and 33 can be woven together in any suitable manner which provides a strong backing member. Each of the strands 31 and 33 is made up of many small fibers (not shown). In the embodiment illustrated, the backing member 25 is 6 ½-oz. plain weave, 100 percent dacron fiber designated by style No. 5133 and obtainable from the Texlon Corporation of Torrance, California. This fabric provides pores of proper size for purposes which will be described subsequently.

In the embodiment illustrated, the low-friction layer 29 consists of an adhesive 35 filled with polytetrafluoroethylene powder 37. TIn the embodiment illustrated, the polytetrafluoroethylene powder 37 is 5-micron polytetrafluoroethylene pure powder and is obtainable from DuPont. The powder and adhesive are present in the amount of 100 grams per square meter of backing member surface and 300 grams per square meter of backing surface, respectively. The adhesive used in the low-friction layer 29 and in the layer 27 are preferably identical and preferably a phenolic base adhesive. One such adhesive which has been found very satisfactorily is Rabond R-84015 produced by Raybestos-Manhattan of Bridgeport, Connecticut. Another suitable adhesive is produced by H. B. Fuller Corporation and is known as Resiweld No. R-7119. Both of these adhesives are thermosetting two-stage adhesives which give a strong chemical bond. Both of these adhesives can be hardened without curing by heating to a temperature under 212°F. and can be cured by heating to a temperature of approximately 300°.

Figure 5:
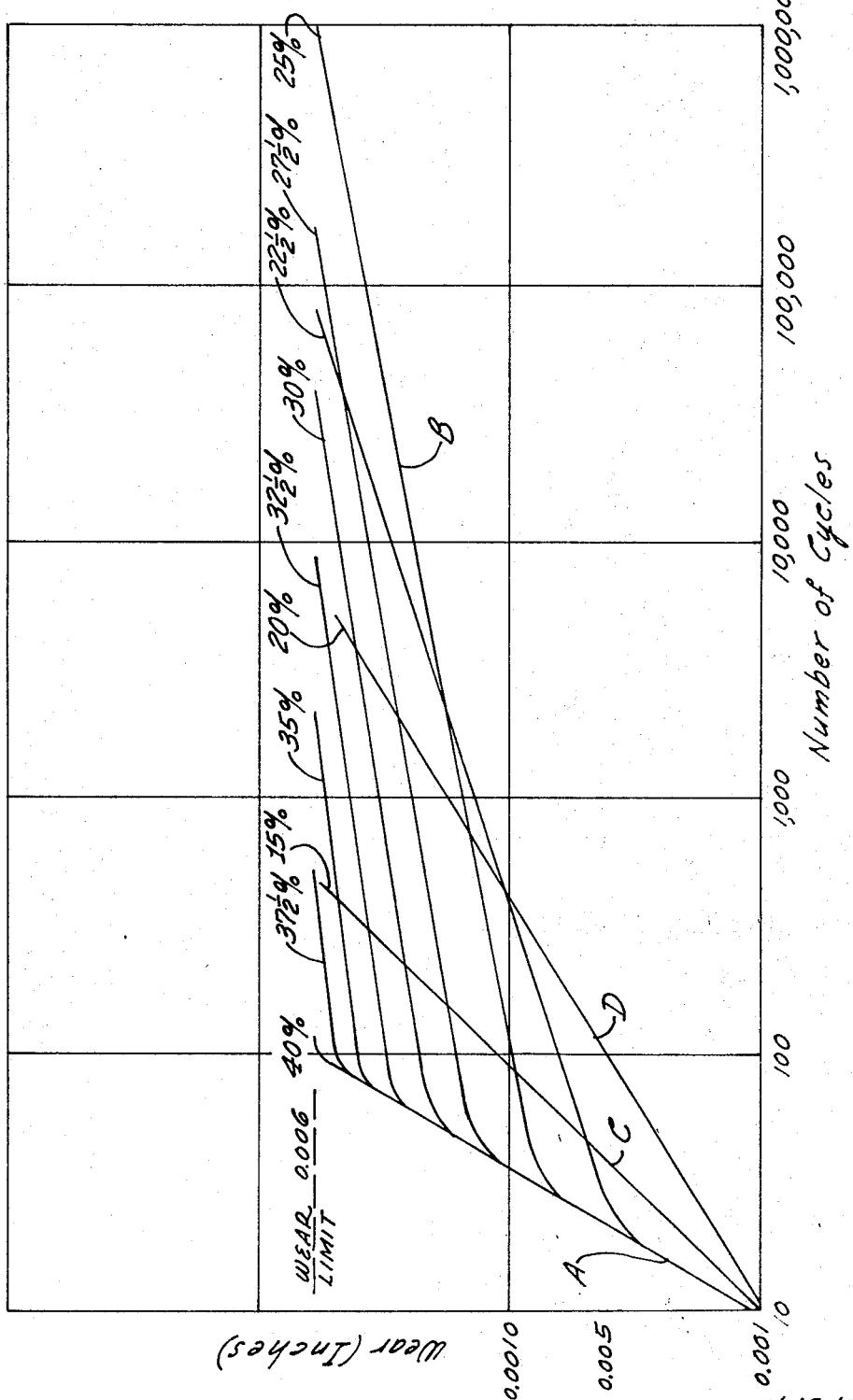
FIG. 5 is a graph of bearing liner wear versus the number of cycles through which the liner is put with the cycles being on a logarithmic scale.

The general effect of varying the relative proportions of low-friction material and adhesive in the low-friction layer 29 is described hereinabove. FIG. 5 is a plot of bearing liner wear versus the number of cycles of operation of the bearing liner for different relative proportions by weight of powdered polytetrafluoroethylene and the Rabond R-84015 adhesive. The number of cycles and the wear are both shown on logarithmic scales. The plot shown in FIG. 5 is accurate for powdered fluorocarbon materials and two-stage phenolic base adhesive generally. Of course, similar curves may be plotted for different low-friction materials.

With reference to FIG. 5, it can be seen that the largest number of cycles to which the bearing liner can be put is obtained with a low-friction layer that contains 25 percent by weight of polytetrafluoroethylene powder and 75 percent by weight of adhesive. If the percentage of polytetrafluoroethylene powder is increased or decreased above or below the 25 percent optimum figure, the wear life as represented by the number of cycles decreases. This is illustrated in FIG. 5 in that the curves other than the 25 percent curve intersect the wear limit line at points located to the left of the point at which the 15 percent curve intersects the wear limit line. It should be noted that good results are still obtainable with low-friction layers containing 22½ percent to 30 percent polytetrafluoroethylene powder, with the remainder being adhesive, and that acceptable results may be obtained from other percentages depending upon the use and desired service life of the bearing liner. Generally acceptable results, at least for some applications, may be obtainable by utilizing a low-friction layer having from 20 percent to about 35 percent polytetrafluoroethylene.

The wear of the bearing liner can be considered as either initial wear or subsequent wear with the initial wear for curves at or about 22 ½ percent polytetrafluoroethylene progressing at a relatively constant rate through progressively increased thicknesses of wear. In FIG. 5, the initial wear portions of the several curves extend generally along the 40 percent curve and is designated by reference character A. The rate of initial wear tends to remain substantially regardless of the amount of low-friction material in the bearing liner, but the duration of the initial wear increases as the amount of the low-friction material in the bearing liner is increases.

Subsequent wear occurs after the completion of initial wear and occurs at a much slower rate than the initial wear. Subsequent wear for the 25 percent curve is designated with a B. Similarly, subsequent wear for the 15 percent and 20 percent curves respectively designated as C and D may be considered as consisting substantially of a subsequent wear portion as initial wear with these percentages of polytetrafluoroethylene is relatively minor.

Generally the initial wear and subsequent wear form two substantially straight and intersecting lines and the overall ability of a given low-friction layer composition to withstand wear is a function of both the initial and subsequent wear characteristics. As will be seen from FIG. 5, the rate of subsequent wear tends to decrease with an increase in the amount of low-friction material to a value of approximately 25 percent. Above a percentage of approximately 25 percent, the rate of subsequent wear tends to remain substantially constant. Thus, considering both initial wear and subsequent wear, a proportion of approximately 25 percent of low-friction material in the bearing liner may be considered to be optimum.

Figure 2:
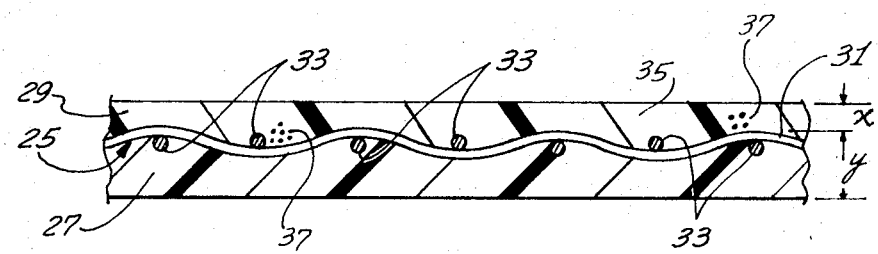
FIG. 2 is an enlarged fragmentary sectional view through the bearing liner.

The thickness of the layer 29 is measured from the uppermost or outermost points or peaks 36 of the backing member 25 to the other surface 38 of the layer 29. This dimension is shown as the X-dimension in FIG. 2 and for optimum results should equal approximately 0.003 inch, at least when the low-friction material constitutes polytetrafluoroethylene. In the embodiment illustrated, the Y-dimension in FIG. 2 is the thickness of the adhesive layer 27 in combination with the backing member 25 and is approximately 0.011 inch.

The bearing liner described has certain important advantages. It provides mechanical bond of the particles 37 of low-friction material in the pores of the backing member 25 and it also provides a chemical bond between the particles 37 and the adhesive 35. The bond is further facilitated by the disposition of the adhesive 35 in the pores of the backing member 25. The optimum wear tends to result in part from the bonds described above and in part because the particles are of such small size and the layer of the bearing liner is so thin that the particles 37 remain in position without becoming smeared into a continuous surface when there is relative rotation between the ball and the race.

As a result of the advantages obtained above, the bearing liners of this invention have a useful life which is considerably longer than the bearing liners now in use. For example, when the bearing liners of this invention have approximately 25 percent of low-friction material by weight, the ball may be rotated relative to the race through approximately 1,000,000 cycles and still produce a wear of only approximately 0.006 inches. This is in contrast to the bearings now in use since these bearings have a wear of approximately 0.006 inches after only approximately 150,000 cycles.

The considerably increased life of the bearings of this invention in comparison to the bearings of the prior art results in part because the initial wear of the bearing liner in the first few cycles is minimized and in part because the subsequent wear of the bearing liner in the remaining cycles is minimized. By minimizing the wear of the bearing liner, play between the ball and the race is minimized. This in turn tends to minimize the tendency of the ball to hit against the race during the rotation of the ball and to wear the bearing line as a result of the line contact with the bearing liner where the ball hits against the race.

As will be seen from the above discussion and from FIG. 5, the subsequent wear of the bearing liner constituting this invention remains substantially constant even when the layer formed by the powder 37 and the adhesive 35 becomes removed through wear. At such time, the strands 31 and 33 of the fabric become exposed but the mixture of the powder 37 and the adhesive 35 in the pores between the strands continues to provide a bearing action with a low-friction effect. This low-friction effect causes the subsequent wear to remain constant until all of the fabric and the mixture between the fabric has become removed through wear.

The amount of the powder 37 in the mixture affects the ease with which the mixture of the adhesive 35 and the powder can be peeled or sheared from the fabric. As will be appreciated, the ease of peeling or shearing this layer tends to increase as the proportion of powder 37 in the mixture increases. This is another reason for providing the powder in the mixture in a relatively small percentage such as approximately 25 percent.

In the embodiment illustrated, the material forming the layer 29 is prepared by first placing 300 grams of Rabond R-84015 phenolic base adhesive in a mixer for every square meter of the backing member 25 which is to be covered. The adhesive in its purchased state is quite viscous and so a commercially available thinner is added to make the adhesive waterlike and such thinner may be added in an amount equal to 800 grams per square meter of surface of the backing member 25 which is to be coated. Next, the 5-micron powder polytetrafluoroethylene powder is gradually added to the thinned adhesive while the mixer stirs the ingredients to produce an intimate mixture. It is important that the polytetrafluoroethylene be added gradually so that is does not form a ball.

The adhesive for the layer 27 can be prepared by mixing a two-stage phenolic base adhesive with a solvent. Preferably, the same adhesive is used for the layers 27 and 29.

Figure 3:
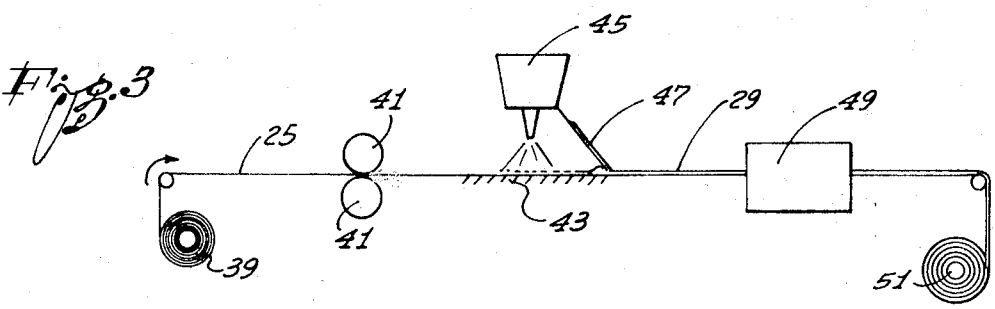
FIG. 3 is a schematic view illustrating a preferred method of making the bearing liner of this invention.

A preferred manner of coating the backing member 25 with either or both of the layers 27 and 29 is shown in FIG. 3. The backing material 25 is wound on a storage reel 39 and pulled by tension rolls 41 over a table 43 or other suitable supporting surface at which the material making up the layer 29 is deposited by a suitable applicator such as a spray gun 45. The thickness of the material deposited is controlled by a fixed blade 47 which causes the material to be applied evenly to form the layer 29.

The backing member 25 having the layer 29 thereon is then run through an oven 49 which heats the layer 29 to a temperature of 150°F. to 200° F. for about 4 to 5 minutes to remove the solvent from the adhesive. No curing of the adhesive takes place in the oven 49. Next, the backing material 25 with the layer 29 thereon is wound on a takeup reel 51. The layer 27 of adhesive can be applied in a similar manner to the other face of the backing member 25 either before or after the application of the layer 29.

Figure 4:
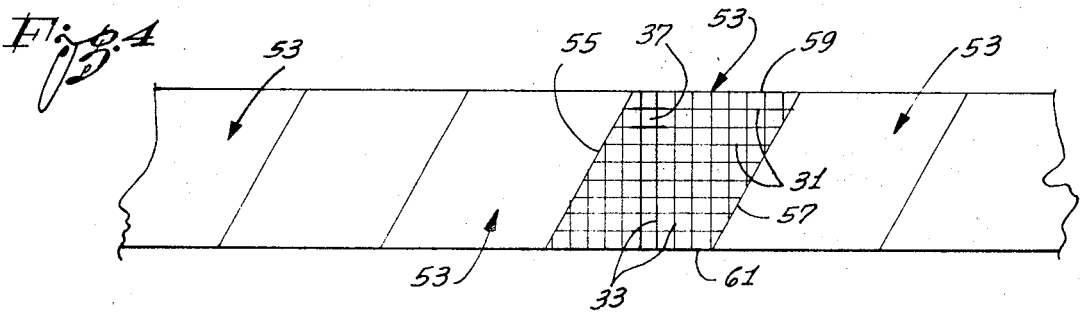
FIG. 4 is a plan view of a strip of bearing liner material with the individual strands of the backing member being diagrammatically shown by horizontal and vertical lines and illustrating a preferred manner of cutting the bearing liner material.

After the layers 27 and 29 are applied to the backing member 25 and prior to the time that the adhesive is cured, the coated backing member is cut into a plurality of sections 53, as shown in FIG. 4. The direction of the strands 31 and 33 is shown diagrammatically in FIG. 4 by the horizontal and vertical lines, respectively. In forming the sections 53, the coated backing member 25 is cut along a line which extends in a direction other than the direction in which either of the strands 31 and 33 extends. Thus, as shown in FIG. 4, the section 53 is generally in the form of a parallelogram and has opposite edges 55 and 57. The edges 55 and 57 extend at an angle with respect to the direction of the strands 31 and 33, such angle preferably being of the order of 45° relative to the strands 31 and 33. Although the other edges 59 and 61 of the section 53 could be made to extend at an angle with respect to the strand direction, satisfactory results are obtained by having only the edges 55 and 57 extend at such an angle.

Next, the section 53 is rolled to the appropriate cylindrical shape and placed within the race 13. At this time, the race 13 will be unswaged and will be subsequently in the form of a cylindrical sleeve. Next, the ball 15 is placed within the liner 17 and the race 13 is swaged to form the construction shown in FIG. 1. Finally, the entire construction shown in FIG. 1 is heated to a temperature of about 300°F. for about 12 minutes to cure the adhesive in the layers 27 and 29 to thereby firmly bond the components of the liner 11 together and to securely bond the liner 11 to the race 13. The cured adhesive will withstand temperatures of up to 650° F. while the polytetrafluoroethylene powder will withstand temperatures of up to approximately 525° F., and accordingly, the temperature limitation of the bearing liner 17 is imposed by the polytetrafluoroethylene powder.

Alternatively, the adhesive of the bearing liner 11 can be cured prior to the time that the race 13 is swaged. This, however, makes the liner somewhat brittle and this may cause problems when the resultant construction is swaged over the ball 15. For this reason, it is preferred to swage the race 13 and the liner 11 prior to curing of the adhesive.

Although an exemplary embodiment of the invention has been shown and described, many changes, modifications, and substitutions may be made by one having ordinary skill in the art without necessarily departing from the spirit and scope of this invention.

I claim:

1. A bearing liner for use between first and second relatively movable members comprising:
    a backing member, said backing member having first and second generally oppositely directed faces, said first face having an irregular surface defined by peaks;
    a low-friction layer including a plurality of particles providing a low friction and a binding agent with the particles being dispersed in the binding agent, said binding agent holding said particles in a cohesive layer to one face of the backing layer, said low-friction layer extending a particular distance above the peaks of the irregular surface of the backing member, said particles being present in sufficient quantity to give the low-friction layer a low coefficient of friction suitable for use as a bearing liner, said particles being of sufficiently small size to be mechanically bonded in the irregular surface of the backing member, the low-friction layer being at very small thickness, and
    an adhesive only on said second face for bonding the backing member and said low-friction layer to said second member with the low-friction layer confronting said first member.

2. A bearing liner as defined in claim 1 wherein the thickness of said low-friction layer above said backing layer is sufficiently small to minimize initial wear of said layer.

3. A bearing liner as defined in claim 1 wherein the relative amount of said low-friction particles in said low-friction layer is less than the relative amount of said binding agent in said low-friction layer to minimize subsequent wear of said layer.

4. A bearing liner as defined in claim 1 wherein the thickness of said low-friction layer above said irregular surface of said backing member as measured from the peaks of said irregular surface is no more than about 0.0035 inch.

5. A bearing liner as defined in claim 1 wherein the backing member includes a plurality of strands defining pores between said strands, the size of said particles being sufficiently small to be mechanically locked between adjacent fibers of at least some of said strands.

6. A bearing liner as defined in claim 1 wherein the particles are a polytetrafluoroethylene.

7. A bearing liner as defined in claim 1 wherein the thickness of said low-friction layer above said irregular surface of said backing member as measured from the peaks of said irregular surface is no more than about 0.0035 inches and wherein the particles have a size no greater than approximately 5 microns.

8. A bearing liner as defined in claim 7 wherein the particles are a polytetrafluoroethylene and constitute approximately 20 percent to 35 percent by weight of the low-friction layer.

9. A bearing liner for use between first and second relatively movable members comprising:
    a low-friction layer having a first surface with a low coefficient of friction and having a first surface for slidably engaging the first member;
    a backing member supporting the low-friction layer, said backing member having first and second generally oppositely directed faces, said first face having an irregular surface;
    said low-friction layer being formed from a mixture of particles of a low-friction material and an adhesive with the particles being chemically bonded to the adhesive and mechanically bonded in the irregular surface of the backing member; said low-friction layer having a thickness outwardly of the irregular surface of said first face of said backing member of no greater than about 0.0035 inch to thereby facilitate the minimizing of initial wear of the bearing liner upon a relative movement between the first and second members; and
    adhesive means supporting the second face of the backing member to the second member.

10. A bearing liner as defined in claim 9 wherein said thickness of said low-friction layer outwardly of the irregular surface of said first face of said backing member is no less than about 0.0025 inch.

11. A bearing liner as defined in claim 9 wherein said thickness of said low-friction layer outwardly of the irregular surface of said first face of said backing member is approximately 0.003 inch and said particles are a polytetrafluoroethylene with a size no greater than about 5 microns.

12. A bearing liner as defined in claim 9 wherein said low-friction layer includes fluorocarbon powder mixed with an adhesive and chemically bound by the adhesive and wherein the backing member constitutes a fabric with an adhesive with strands defining pores of proper size to mechanically bond the fluorocarbon powder in the pores.

13. A bearing liner as defined in claim 12 wherein the fluorocarbon is polytetrafluoroethylene and makes up from about 20 percent to about 35 percent by weight of the low-friction layer and the particles of the powder are of a size no greater than about 5 microns.

14. A bearing liner bondable to a support and providing a bearing from a member movable past the support, comprising:
    a woven fabric backing member including a plurality of strands defining pores, said backing member having first and second faces;
    a low-friction layer including a low-friction powder intimately mixed with an adhesive, said adhesive chemically binding the particles of the powder in the mixture and bonding the low-friction layer to said first face, the powder being present in the layer in an amount less by weight than the adhesive and in an amount sufficient to give the low-friction layer a low coefficient of friction, the powder being of sufficiently small size to be mechanically locked in the pores of the fabric backing member, the layer being provided with a very thin dimension above the first face to minimize initial wear of the layer; and an adhesive on the second face of said backing member for bonding said backing member to the support for the bearing liner.

15. a bearing liner as defined in claim 14 wherein the powder forms about 20 to 35 percent by weight of the low-friction layer to minimize initial and subsequent wear of the bearing liner upon repetitive movements of the member past the support.

16. A bearing liner as defined in claim 14 wherein the size of the particles of powder are no greater than about 5 microns and constitute a fluorocarbon.

17. A bearing liner as defined in claim 14 wherein the thickness of the low-friction layer above the first face of the strands is no greater than approximately 0.0035 inches.

18. A bearing liner as defined in claim 14 wherein said backing member includes a woven fabric of synthetic strands with pores of proper size to mechanically lock the particles of powder.

19. A bearing liner as defined in claim 14 wherein the powder is a polytetrafluoroethylene and makes up approximately 25 percent by weight of the low-friction layer.

20. A bearing liner as defined in claim 19 wherein the particle size of the powder does not substantially exceed 5 microns and the backing member includes a woven fabric of synthetic strands with pores of proper size to mechanically lock the particles of powder.

21. A bearing liner as defined in claim 20 wherein the thickness of the low-friction layer above the first surface does not exceed about 0.0035 inches.

22. A bearing liner bondable to a support and providing a bearing from a member movable past the support comprising:
a backing member having first and second generally oppositely directed faces and having irregular surfaces on at least one of the faces with the irregular surfaces having peaks;
a low-friction layer including a plurality of particles providing a low-friction and a binding agent with the particles being dispersed in the binding agent. Said binding holding said particles in a cohesive layer to the irregular surface of the backing member, said particles being present in sufficient quantity to give the low friction layer a low coefficient of friction suitable for use as a bearing liner, said layer having a thickness above the peaks of the irregular surfaces of the backing member not greater than approximately 0.0035 inches; and
an adhesive on the other face of the backing member for bonding the backing member to the second relatively movable member with the low-friction layer confronting the first relatively movable member.

23. A bearing liner as specified in claim 22 wherein the particles are a fluorocarbon and constitute approximately 25 percent to 35 percent by weight of the dispersion.

24. The bearing liner specified in claim 23 wherein the particles have a size not greater than approximately 5 microns.